United States Patent [19]

Wallis

[11] 4,044,859

[45] Aug. 30, 1977

[54] LUBRICATING MEANS FOR GAS-OPERATED CYLINDERS

[76] Inventor: Bernard J. Wallis, 25200 Trowbridge Ave., Dearborn, Mich. 48124

[21] Appl. No.: 722,862

[22] Filed: Sept. 13, 1976

[51] Int. Cl.$^2$ .......................... F16N 1/00; F16N 23/00
[52] U.S. Cl. ................................ 184/18; 184/55 A; 92/154; 92/156; 137/268; 137/110
[58] Field of Search .................. 184/5, 6.26, 18, 19, 184/24, 25, 100, 102, 55 R, 55 A; 277/17–19, 21; 269/118, 119; 92/153, 154, 156; 137/516.11, 511, 268, 110

[56] References Cited

U.S. PATENT DOCUMENTS

| 648,153 | 4/1900 | Serve | 92/156 X |
|---|---|---|---|
| 2,606,715 | 8/1952 | Martin | 184/55 R X |
| 3,076,525 | 2/1963 | Lansky et al. | 184/18 UX |
| 3,112,013 | 11/1963 | Tine | 184/55 A X |
| 3,837,432 | 9/1974 | McKendrick | 184/18 X |

Primary Examiner—David H. Brown
Attorney, Agent, or Firm—Barnes, Kisselle, Raisch & Choate

[57] ABSTRACT

In a fluid spring arrangement for a metal forming die assembly of the gas-operated, piston-cylinder type, the surfaces of the piston and cylinder which are in sliding contact are lubricated by lubricant entrained in the pressurized gas directed into the working chamber of the cylinder. The lubricant is contained in an apertured cartridge within the cylinder through which the gas is constrained to flow. A valve plate cooperates with an apertured wall of the cartridge to entrain lubricant in the gas when the flow of gas is into the cylinder and prevent the entrainment of lubricant when the flow of gas is out of the working chamber of the cylinder.

15 Claims, 3 Drawing Figures

LUBRICATING MEANS FOR GAS-OPERATED CYLINDERS

This invention relates to fluid cylinders and, more specifically, to means for lubricating piston-cylinder units of the type operated by gas under pressure in a closed fluid system.

In metal die forming operations it is common practice to yieldably restrain movement of movable die members by means of fluid springs. Frequently such fluid springs comprise piston cylinder units connected to a reservoir of gas under pressure, such as nitrogen. With such closed pressure systems the gas itself does not contain a lubricant, as is the case with systems wherein piston-cylinder units are operated by pressurized air supplied by a compressor and the air lines are equipped with lubricators. Thus, in closed type systems of the type to which the present invention relates in order to reduce wear and minimize service problems it is desirable to provide auxiliary means to lubricate the surfaces of the cylinder, piston and piston rod which are in sliding contact.

The present invention has for its primary object the provision of a novel lubricating arrangement for piston-cylinder units of the type described.

More specifically, the present invention contemplates a piston-cylinder arrangement wherein the head end of the cylinder is defined by a manifold plate having a passageway therein communicating at one end with a reservoir of gas under pressure and at its other end with a port in the working chamber of the cylinder opposite the rod end thereof. Directly adjacent the gas port at the head end of the cylinder there is arranged an apertured cartridge containing a lubricant-impregnated material through which the pressurized gas is directed from the gas port into the working chamber of the cylinder. A valve plate is associated with the lubricant cartridge to block the apertures of the lubricant cartridge when the pressure in the working chamber of the cylinder exceeds the pressure at the gas port. The valve plate is also adapted to shift to a non-blocking position relative to the apertures in the lubricant cartridge in response to a pressure differential across the cartridge wherein the pressure at the gas port is higher than in the working chamber to thereby permit the full free flow of gas through the lubricant-impregnated material into the working chamber to thereby lubricate the surfaces of the piston and cylinder which are in sliding contact.

Other objects, features and advantages of the present invention will become apparent from the following description and accompanying drawings, in which.

Figure 1:
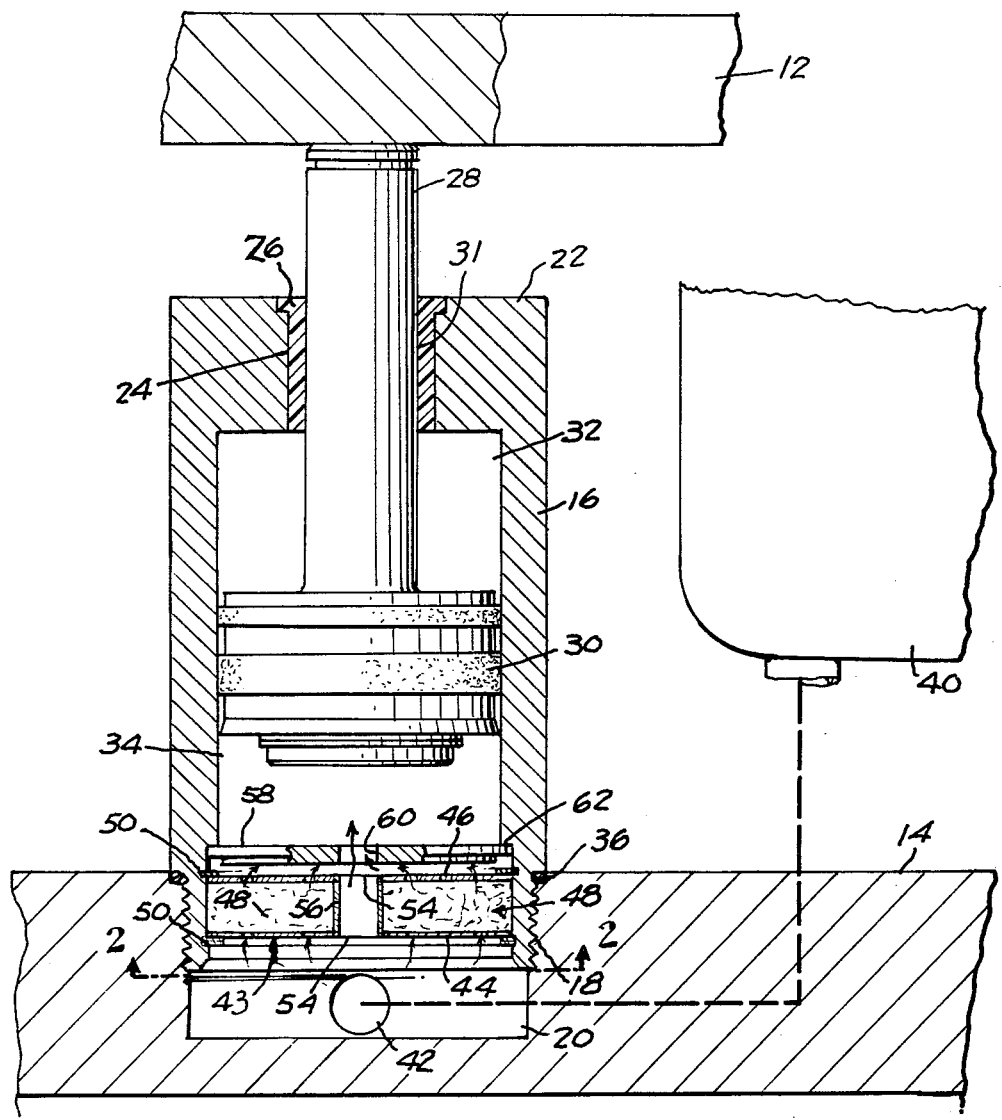
FIG. 1 is a fragmentary vertical sectional view of a gas-operated cylinder assembly according to the present invention illustrating the manner in which it is used in a die assembly.
Figure 2:
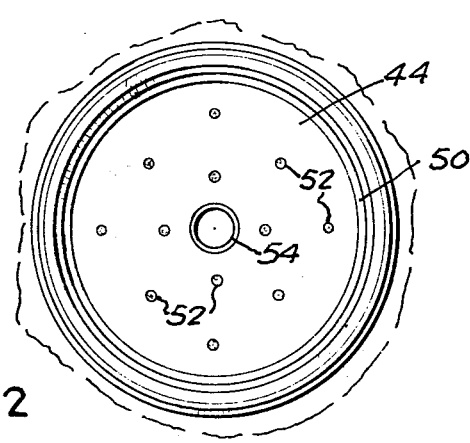
FIG. 2 is a sectional view along the line 2—2 in FIG. 1.
Figure 3:
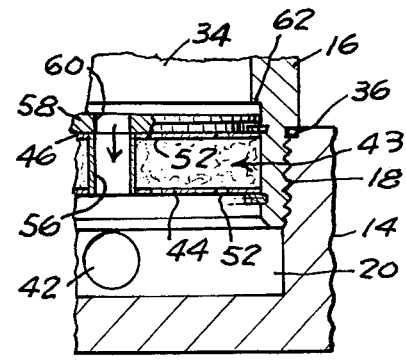
FIG. 3 is a fragmentary view of a portion of the arrangement illustrated in FIG. 1 showing the valve plate in the closed position.

Referring first to FIG. 1, there is illustrated a fluid spring generally designated 10 in the form of a piston-cylinder unit which, in accordance with the present invention, is arranged between a vertically movable die member 12 and a fixed support 14. In the illustrated arrangement support 14 comprises a manifold plate of a die assembly of which die member 12 forms a part. The overall arrangement shown in FIG. 1 is generally similar to that illustrated in my copending application Ser. No. 559,660, filed Mar. 19, 1975, now U.S. Pat. No. 4,005,763. Piston-cylinder unit 10 comprises a cylinder 16, the lower or head end of which is threaded as at 18 into a bore 20 of manifold plate 14. The upper or rod end of cylinder 16 comprises an end wall 22 having a central bore 24 in which is fitted a plastic bushing 26. Bushing 26 forms a bearing for the rod 28 of piston 30 which is axially reciprocable in the cylinder. Bore 31 of bushing 26 has a vent groove (not shown) which extends axially along the bore of the bushing. Piston 30 divides the cylinder into an idle chamber 32 and a working chamber 34. The upper end of piston rod 28 abuts the lower face of die member 12.

Cylinder 16 is sealed in bore 20 by an O-ring 36. A passageway 38 in manifold plate 14 extends from a reservoir 40 containing a gas (such as nitrogen) under pressure to a port 42 in bore 20. Adjacent the lower end of cylinder 16 there is arranged a lubricant cartridge 43 comprising two axially spaced apart discs 44, 46. The space between these discs is filled with an air-permeable fibrous material 48 impregnated with a lubricant (such as oil). Cartridge 43 is retained in place by snap rings 50. Each disc is formed with a plurality of apertures 52 therein. They are also provided with a larger central opening 54, the openings 54 on the two discs being axially aligned and interconnected by a tubular sleeve 56. The fibrous material 48 between discs 44, 46 surrounds sleeve 56. If desired, the two discs can be permanently attached to sleeve 56 so as to form an integral assembly therewith.

Above disc 46 there is arranged within cylinder 16 a valve plate 58 having a central opening 60 registering axially with the passageway through sleeve 56. The bottom face of valve plate 58 is flat and adapted to contact upper disc 46 to effectively block the apertures 52 therein. Valve plate 58 is formed of a light weight material so that it is capable of being lifted from contacting engagement with top disc 46 by the pressure of the gas admitted to bore 20 through port 42. The upward movement of valve plate 58 is limited by a shoulder, as at 62.

In operation, in the idle position of the die assembly die member 12 is in an elevated position and the pressure of the gas in working chamber 34 by reason of its connection with reservoir 40 retains piston 30 in a raised position adjacent the rod end of the cylinder. When the downward force exerted on piston rod 28 by die member 12 exceeds the upward force on the piston exerted by the pressurized gas in chamber 34, piston 30 descends and valve plate 58 is urged downwardly into contact with disc 46. Thus, the only communication between working chamber 34 and port 42 is through the central opening 60 in valve plate 58 and sleeve 56. However, when the downward force on die member 12 is relieved, the pressure in working chamber 34 drops to a value below the pressure in reservoir 40 and gas under pressure is directed into bore 20. The pressurized gas in bore 20 flows upwardly through apertures 52 and through sleeve 56. The gas flowing through apertures 52 in disc 44 entrains lubricant from the material 48 and flows upwardly through apertures 52 in disc 46 and then through central opening 60 into the working chamber 34. This occurs because the differential pressure between bore 20 and working chamber 34 causes valve plate 58 to be lifted upwardly out of contact with disc 46. The lubricant entrained in the gas flowing into working chamber 34 effectively lubricates the surfaces of piston 30 and cylinder 16 which are in sliding contact. It will be appreciated, of course, that as the piston reciprocates in the cylinder air is admitted to and exhausted from idle chamber 32 through the vent groove in bushing 30.

It will be noted that, when piston 30 is displaced in the cylinder toward bore 20, valve plate 58 gravitates into contact with upper disc 46 to block the opening 52 therein. Thus, the gas in working chamber 34 is exhausted therefrom exclusively through sleeve 56 rather than through apertures 52 and the lubricant-impregnated material 48. Accordingly, valve plate 58 serves as a check valve which permits the flow of lubricant entrained in the gas in a direction upwardly or into working chamber 34, but precludes the flow of gas through openings 52 and the lubricant-impregnated material 48 in the opposite direction. Thus, the supply of lubricant in the material 48 is not unnecessarily depleted and does not accumulate at the bottom of bore 20. If it becomes necessary to replenish the supply of lubricant, this can be accomplished by simply removing cylinder 16 from manifold plate 14 and adding more oil to material 48 or simply removing cartridge 43 and replacing it with a fresh cartridge.

I claim:

1. In combination, a cylinder, a piston in said cylinder dividing it into a working chamber adjacent the head end of the cylinder and an idle chamber adjacent the rod end of the cylinder which vary inversely in size in response to reciprocation of the piston in the cylinder, said piston having a rod extending axially through said idler chamber and outwardly beyond the rod end of the cylinder for connection with a force-applying means for displacing the piston in a direction toward the head end of the cylinder, port means adjacent the head end of the cylinder for introducing gas under pressure to said working chamber for displacing the piston in a direction toward the rod end of the cylinder, means defining a lubricant chamber interposed between said port means and said working chamber and through which the gas from said port means is directed to said working chamber, an air-permeable, lubricant-impregnated material in said lubricant chamber, said lubricant chamber having a wall provided with a plurality of apertures through which said gas is adapted to flow from said lubricant chamber to the working chamber, a valve plate cooperating with said apertured wall for blocking said apertures when the gas pressure in the working chamber is equal to or exceeds the pressure at said port means and means for causing the gas to bypass said lubricant chamber when the gas flow is from the working chamber toward said port means.

2. The combination set forth in claim 1 wherein the head end of said cylinder is defined by a manifold plate having a gas passageway therein adapted to be connected to a source of gas under pressure and communicating with said port means.

3. The combination set forth in claim 2 wherein said cylinder is removably mounted on said manifold plate to enable access to said lubricant chamber.

4. The combination set forth in claim 1 wherein said bypassing means comprises an aperture in said valve plate registering with an additional aperture in said wall of said lubricant chamber.

5. The combination set forth in claim 4 wherein said wall is disposed on the side of the lubricant chamber adjacent said working chamber.

6. The combination set forth in claim 5 wherein said valve plate is disposed in said working chamber.

7. The combination set forth in claim 5 wherein the axis of said cylinder is generally vertical, said lubricant chamber being located adjacent the lower end of the cylinder and said valve plate being located at the upper side of the lubricant chamber.

8. The combination set forth in claim 4 wherein the axis of the cylinder is generally vertical, said lubricant chamber being located adjacent the lower end thereof and being defined by a pair of vertically spaced upper and lower walls which are apertured, said first-mentioned wall comprising the upper wall of the lubricant chamber and said valve plate being gravitationally supported on said upper plate.

9. The combination set forth in claim 8 wherein the lower wall includes an opening registering with the additional opening in the upper wall and including a sleeve extending between said openings, the lubricant-impregnated material extending around said sleeve.

10. The combination set forth in claim 9 wherein said sleeve interconnects said upper and lower walls.

11. The combination set forth in claim 4 including means in said lubricant chamber defining a passageway communicating with said additional aperture in the lubricant chamber wall and isolated from the lubricant-impregnated material in said lubricant chamber.

12. The combination set forth in claim 11 wherein said valve plate is movable axially of the cylinder in response to a pressure differential across the lubricant chamber.

13. The combination set forth in claim 11 wherein said bypassing means includes said valve plate, said valve plate being adapted to shift to a non-blocking position relative to the first-mentioned apertures in the first-mentioned wall of said lubricant chamber in response to a pressure differential across said lubricant chamber wherein the pressure on the port means side of the lubricant chamber is in excess of the pressure on the valve plate side thereof.

14. The combination set forth in claim 11 wherein said lubricant chamber extends transversely of the axis of said cylinder and includes a second wall spaced axially from said one wall toward said port means, said lubricant chamber being defined by the space between said two walls.

15. The combination set forth in claim 14 wherein the second wall of said lubricant chamber is provided with a plurality of apertures therein through which said gas is directed from said port means into said lubricant chamber.

* * * * *